US011178363B1

(12) United States Patent
Qian et al.

(10) Patent No.: US 11,178,363 B1
(45) Date of Patent: Nov. 16, 2021

(54) DISTRIBUTED MEDIA MONITORING

(71) Applicant: ObjectVideo Labs, LLC, Tysons, VA (US)

(72) Inventors: Gang Qian, McLean, VA (US); Allison Beach, Leesburg, VA (US); Donald Gerard Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 1 day.

(21) Appl. No.: 16/913,604

(22) Filed: Jun. 26, 2020

Related U.S. Application Data

(60) Provisional application No. 62/867,585, filed on Jun. 27, 2019.

(51) Int. Cl.
  *H04N 7/18* (2006.01)
  *G08B 13/196* (2006.01)
  *G06K 9/00* (2006.01)

(52) U.S. Cl.
  CPC ......... *H04N 7/188* (2013.01); *G06K 9/00771* (2013.01); *G08B 13/19613* (2013.01); *H04N 7/181* (2013.01)

(58) Field of Classification Search
  CPC .......... H04N 7/188; H04N 7/181; H04N 7/18; H04N 5/23206; H04N 5/232061; H04N 5/23218–5/23225; H04N 5/23245; H04N 5/23254; H04N 5/247; G08B 13/19613; G08B 13/19636; G08B 13/19639; G08B 13/19641–19669; G08B 13/19689; G06K 9/00771; G06T 7/20
  See application file for complete search history.

(56) References Cited

U.S. PATENT DOCUMENTS

| 9,165,190 | B2 | 10/2015 | Zhang et al. | |
|---|---|---|---|---|
| 2005/0021201 | A1* | 1/2005 | Klotz | G01S 13/86 702/189 |
| 2005/0088295 | A1* | 4/2005 | Kondo | G08B 13/19641 340/517 |
| 2010/0097464 | A1* | 4/2010 | Volpe | H04N 5/765 348/143 |
| 2013/0194427 | A1* | 8/2013 | Hunter | H04N 7/188 348/157 |
| 2015/0201164 | A1* | 7/2015 | Yun | H04N 5/23206 348/159 |
| 2016/0219208 | A1* | 7/2016 | Horesh | H04N 5/2329 |

(Continued)

FOREIGN PATENT DOCUMENTS

EP 1889205 2/2008

*Primary Examiner* — John W Miller
*Assistant Examiner* — Humam M Satti
(74) *Attorney, Agent, or Firm* — Fish & Richardson P.C.

(57) ABSTRACT

Methods, systems, and apparatus, including computer programs encoded on a computer storage medium, for generating distributed jobs for cameras in a monitored property. The methods, systems, and apparatus include actions of obtaining a request to process a video based on an event detected by a first camera at a monitored property, determining resources likely to be available corresponding to the other cameras at the monitored property, allocating one or more tasks corresponding to processing the video to the other cameras based on the resources likely to be available corresponding to the other cameras, and providing the one or more allocated tasks to the first camera and to the other cameras.

18 Claims, 5 Drawing Sheets

(56) References Cited

U.S. PATENT DOCUMENTS

| | | | |
|---|---|---|---|
| 2018/0018081 A1* | 1/2018 | Dattilo-Green | H04N 7/181 |
| 2019/0188042 A1* | 6/2019 | Koh | G06F 9/4843 |
| 2019/0394264 A1* | 12/2019 | Yu | H04N 5/247 |
| 2020/0272524 A1* | 8/2020 | Citerin | G06F 9/5038 |

* cited by examiner

DISTRIBUTED MEDIA MONITORING

CROSS-REFERENCE TO RELATED APPLICATIONS

This application claims the benefit of U.S. Provisional Application No. 62/867,585, filed Jun. 27, 2019, which is incorporated by reference in its entirety.

TECHNICAL FIELD

The subject matter of the present disclosure is generally related to video processing.

BACKGROUND

Sensor data, such as text, audio, voice, image, and video data, can be processed on cameras using artificial intelligence. However, the computing power, memory, or storage resources available on a single camera may be insufficient to process the sensor data in real-time. For example, a processor on a single camera may not be fast enough to produce results at a required throughput rate when performing human detection on an image.

SUMMARY

The subject matter of the present disclosure is related to techniques for distributed processing of data, e.g., sensor data, using multiple co-located devices. In particular, multiple devices, e.g., cameras, can be co-located on the same local network and can process events of interest that sparsely occur. For example, in residential video surveillance applications, a residential property usually includes multiple cameras installed to monitor the entirety of the property. Each camera can monitor a different area of the property, such as the entrance, the front yard, sidewalk, driveway, and backyard. Usually, when an event occurs, such as motion detection, not every camera in the residential property can see the event. For example, when a car pulls in the driveway, the camera monitoring the driveway can be the only camera that sees the car approaching.

Typically, when the cameras have varying levels of compute resources available, it can be difficult to share the processing or to share resources across the different cameras. Thus, in the example of the camera noticing the car approaching the driveway, the driveway camera needs to conduct all the required video processing using its own limited compute resources while all the other cameras remain idle. Consequently, the limited resources of the camera can cause a delay in processing of the video in real-time and not allow a property owner to be timely notified of the event. To address this delay and inefficiency, the techniques described throughout this specification organize co-located cameras to operate in a local computing cloud.

In the local computing cloud, the resources between each of the cameras can be shared to better promote real-time processing of events. These cameras can be treated as nodes of the local computing cloud, each having a unique node ID. The resources of each of the co-located camera may be dynamically allocated to fulfill the data processing needs associated with a detected event. Since the cameras are co-located on the same local network, e.g., co-located on a WiFi or Bluetooth connection, communication and data transfer between these cameras may have low latency compared to transfer across the Internet.

Implementations of the described techniques can include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements.

DETAILED DESCRIPTION

Figure 1A:
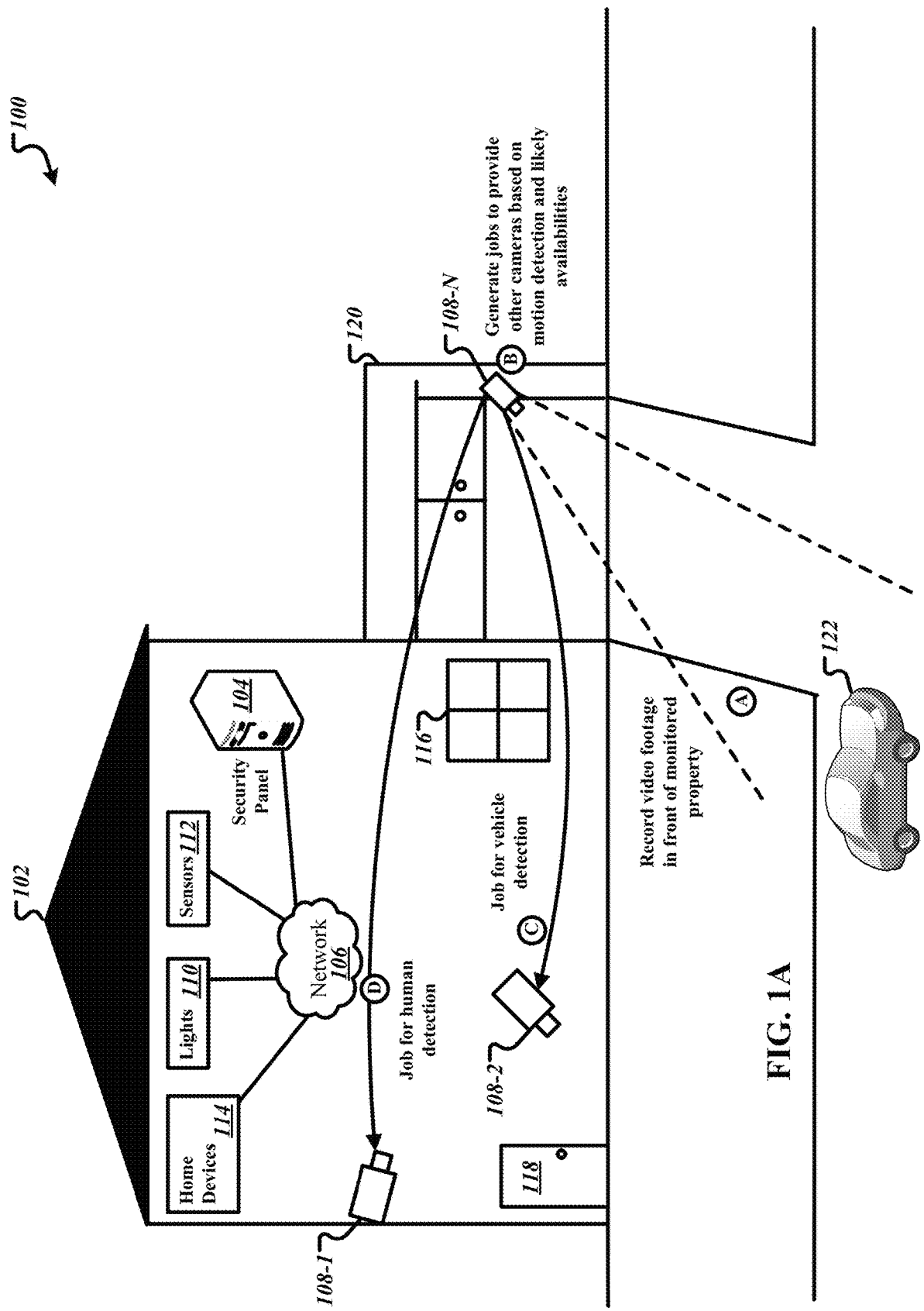
FIG. 1A is a context diagram of an example system of a monitored property illustrating a camera distributing video processing to other cameras based on a detected event.

FIG. 1A is a context diagram of an example system 100 of a monitored property 102 illustrating a camera distributing video processing to other cameras based on a detected event. Though system 100 is shown and described including a particular set of components including a security panel 104, lights 110, sensors 112, home devices 114, cameras 108-1 through 108-N, the present disclosure need not be so limited. For instance, in some implementations, only a subset of the aforementioned components can be used by the system 100 for sharing video processing by co-located cameras in a monitored property. Similarly, there can be other implementations in which the security panel 104 is included within a monitor control unit and that monitor control unit is located external to the monitored property 102. As an example, there can be implementations that do not include home devices 114. Yet other alternative exemplary systems also fall within the scope of the present disclosure such as a system 100 that does not use a security panel 104. For these reasons, the system 100 should not be viewed as limiting the present disclosure to any particular set of necessary components.

As shown in system 100, a monitored property 102 can be monitored by a security panel 104 that includes components within the monitored property 102. The monitored property 102 can be a residential facility, such as a home, a commercial facility, such as an office building, a storage facility, or a warehouse, to name a few examples. The components within the monitored property 102 can include one or more cameras 108-1 through 108-N (collectively, cameras 108), one or more lights 110, one or more sensors 112, and one or more home devices 114. The cameras 108 can include video cameras that are located at various places throughout the monitored property 102. For example, camera 108-1 monitors the front foyer at the interior of the monitored property 102, camera 108-2 monitors the front door 118 at the exterior of the monitored property, and camera 108-N monitors the driveway of the monitored property 102 at the garage 120. The monitored property 102 can include other cameras not illustrated in the system 100. For example, the monitored property 102 can include cameras monitoring the basement, each of the bedrooms, the living room, and the kitchen.

The one or more sensors 112 can include a motion sensor located at the exterior of the front door 118, a front door sensor that includes a contact sensor positioned at the front door 118, a pressure sensor that receives button presses at a light device, a lock sensor that is positioned at the front door 118 and each window, e.g., window 116. Additionally, the one or more sensors 112 can include a passive infrared sensor (PIR) located at the interior of the monitored property 102, thermal sensors, depth sensors, infrared beam trip sensors, weight sensors, seismic sensors, inductive loop sensors, such as vehicle detection loops, an RGB-D camera, and one or more light curtain sensors. Each of these sensors can be positioned in and around the monitored property 102 for the security panel 104 to rely on for monitoring purposes.

The contact sensor can sense whether the front door 118 or the one or more windows 116 is in an open or closed position. The lock sensor can sense whether the front door 118 and each window 116 is in an unlocked or locked position. The one or more home devices 114 can include home appliances, such as a washing machine, a dryer, a dishwasher, an oven, a stove, a microwave, and a laptop, to name a few examples. Additionally, should the monitored property 102 be a commercial facility, the one or more home devices 114 can include a printer, a copier, a vending machine, and a fax machine to name a few examples.

The security panel 104 communicates over a wired or wireless network connection with each of the one or more lights 110, the one or more sensors 112, and the one or more home devices 114, e.g., washing machine, a dryer, a dishwasher, an oven, a stove, a microwave, a laptop, etc., to receive sensor data descriptive of events detected by each of these components in the monitored property 102. The sensor data can be transmitted to the security panel 104 with identification data indicating the component that transmitted the sensor data.

In some implementations, the components within the monitored property 102 can communicate with one another and with the security panel 104. The components can communicate over Wi-Fi, Bluetooth, or any other protocol used to communicate over a network. Additionally, the security panel 104 can communicate over a long-ranged wired or wireless connection with an external data system over a network.

The external data system can be remotely located from the monitored property 102 and monitor the property 102 as well as many other properties. The security panel 104 can communicate bi-directionally with the external data system and bi-directionally with the components in the monitored property 102. Additionally, the security panel 104 can communicate with one or more client devices over the network 106. The security panel 104 can forward sensor data from the components within the monitored property 102 to the external data system and to the one or more client devices over the network 106.

The one or more sensors 112 can detect a presence, a movement, or a change in position of an object at the monitored property 102. The object can include an individual, such as a property owner, an animal, such as a pet, or an item found within the monitored property 102, to name a few examples. For example, the monitored property 102 can include a movement sensor located near the garage 120 that detects the movement of a car or a person near the garage. The movement sensor can trigger when a movement is sensed at the garage 120 and provide movement data to the security panel 104 in response.

In another example, the camera 108-2 can detect movement at the front door 118 of the monitored property 102. The camera 108-2 can use object detection, facial recognition, and classification techniques to determine whether movement has occurred. Additionally, the camera 108-2 can include one or more motion sensors that detect movement that trigger to the camera 108-2 to initiate recording, such as a PIR motion sensor. The motion sensors can provide some indication that motion has occurred in the motion sensors field of view, such as, whether motion occurs from a moving person, a moving pet, or a falling object.

In some implementations, each of the one or more sensors 112 and one or more cameras 108 can provide data to the security panel 104. For example, the one or more cameras 108 can provide a stream of real-time video to the security panel 104 that indicate a detection is likely. In some examples, the security panel 104 can analyze the stream of real-time video to determine whether the detection of movement exists. In another example, the sensor can stream data in the format of voltage to the security panel 104, where a voltage high indicates a detection corresponding to the type provided by the sensor, such as five volts (V), or a low voltage indicates no detection, such as one V. For example, a high voltage can indicate a likelihood of a detection corresponding to the sensor and low voltage can indicate a likelihood of no detection. Additionally, the sensor or the security panel 104 can timestamp the sensor data, e.g., voltage data, to indicate a time at which the detection or no detection has occurred.

As illustrated in system 100, different events can occur at the monitored property 102 that less than all cameras detect or can see in real time. For example, camera 108-N detects motion in front of the monitored property 102, and in particular, in front of the garage 120. The other cameras 108-1 and 108-2 do not detect the same motion because they monitor different fields of view at the monitored property 102. In another example, camera 108-1 detects movement in the foyer of the monitored property 102 that cameras 108-2 and 108-N do not detect. At another point in time, camera 108-2 detects movement at the front door 118 of the monitored property 102 that camera 108-N did not detect because a user is exiting the monitored property 102. In each of these examples, in order for the camera to process the data in real-time, each camera needs to have the processing power and the bandwidth to process the event data.

In some cases, the camera 108-N can perform facial recognition on a detected individual found near the garage 120 while at the same, detect movement from vehicle 122 at the front of the monitored property 102. The processing for detecting movement from vehicle 122 must take a backseat and wait while the camera 108-N finishes performing the facial recognition on the detected individual. Thus, the cameras 108 might detect events in a short time span and have to process each event in the order in which they were detected. This can create an issue when the cameras need to process different events in real time in order to provide notifications to the property owner, and possibly even to local authorities should intruders be attempting to gain access to the monitored property.

In order to address these situations, each of the co-located devices, e.g., each of the cameras, can be organized into a local computing cloud. In some examples, a local computing cloud may refer to a devices on a local area network that share computing resources. The local computing cloud allows for sharing resources and processing between each of the cameras 108. Thus, the cameras are treated as nodes in the local computing cloud. Each camera may be associated with a unique node ID for identification purposes. Consequentially, the local computing cloud can dynamically allocate one or more tasks from a particular camera to one or more of the other cameras based on requirements of the processing and resources like available associated with each of the cameras.

The local computing cloud includes a job scheduler that manages task assignment and sharing of data between each of the cameras. One or more processors on the cameras at the monitored property 102 can execute the job scheduler. Alternatively, one or more processors on the security panel 104 can execute the job scheduler. The job scheduler monitors computing resources for each of the cameras located at the monitored property 102. The job scheduler can determine available computing resources for each camera at a particular time and determine how much computing resources were available for each camera over a previous period of time. Additionally, the job scheduler can predict an amount of computing resources to be available for a particular camera at a point in time in the future. The job scheduler can perform this prediction based on trends of previous resources available for each particular camera. Likewise, based on determining the resources available for a particular camera, the job scheduler can also determine how likely it is that a particular camera is busy performing other processing requests with no idle cycles to spare In addition, the job scheduler can maintain a dynamical record of computer resources available for each camera found in the monitored property 102.

In some implementations, the job scheduler can receive data from at least one of the cameras for performing a particular function. For example, the job scheduler can receive a request with video footage from a particular camera for processing the video footage. In this example, camera 108-N can record video footage in front of the garage 120 at the monitored property 102. In response, the camera 108-N provides the recorded video footage to the job scheduler over network 106, if necessary, requesting that it process the video footage to determine whether motion exists in the video footage. In this example, the job scheduler is located at the security panel 104. The job scheduler can also be located at camera 108-N or located in memory at another camera, such as camera 108-1.

Upon receiving the data processing request and video footage from the camera 108-N, the job scheduler determines one or more jobs to perform based on the data processing request. Once the jobs are determined, the job scheduler distributes each of the jobs for processing the video footage to the cameras. The job scheduler can distribute each of the jobs to the cameras based on available computing resources for each of the nodes. For example, as illustrated in system 100, the job scheduler determines that camera 108-1 has 10% computer resources available, camera 108-2 has 70% computer resources available, and camera 108-N has 80% computer resources available. Thus, the job scheduler distributes the various jobs to each of the cameras based on their compute resources available.

Next, the job scheduler instructs the requesting camera to provide the video footage to the other cameras that were distributed jobs. For example, if the recorded video footage provided by camera 108-N is thirty seconds long, the job scheduler can instruct camera 108-N to process twenty seconds of video footage based on its 80% computer resources available. Additionally, the job scheduler can instruct camera 108-N to provide eight seconds of video footage to camera 108-2 to process based on its 70% computer resources available. Then, the job scheduler instructs camera 108-2 to perform a particular type of processing on the eight seconds of video footage received from camera 108-N. The particular type of processing can include a recognition algorithm, such as facial recognition or object recognition. In this example, each camera is instructed to perform the same type of job, such as facial recognition. The job scheduler can instruct the cameras to notify the job scheduler of the results of the processing and its current compute resources upon finishing the assigned processing. Alternatively, the job scheduler can instruct each node to perform the same task across different portions of the video footage.

In some examples, if the job scheduler determines each camera has the same or roughly the same compute resources available, e.g., within a threshold amount, the job scheduler can instruct the requesting camera to distribute an even amount of footage, e.g., ten seconds of video footage, to each of the other cameras for processing.

In some implementations, the job scheduler can provide different tasks to the cameras to perform based on their corresponding compute resources available. For example, the job scheduler can instruct camera 108-1 to perform facial recognition on its portion of the video footage. Additionally, the job scheduler can instruct camera 108-2 to perform object classification on its portion of the video footage. Lastly, the job scheduler can instruct camera 108-N to perform motion detection on its portion of the video footage. In some cases, facial recognition and object classification are more processor intensive than motion detection processing, and as a result, the cameras with the higher compute resources available are instructed to perform the higher processor intensive tasks. Similarly, the cameras with the lower compute resources available are instructed to perform the lower processor intensive tasks, e.g., motion detection.

Once the job scheduler assigns tasks to each of the cameras and provides the media to each of the cameras, the job scheduler generates a distributed data processing job. In particular, in the distributed data processing job, the job scheduler can assign the initial requesting node as a master node for the job and all other nodes that are tasked with an assignment as servant nodes. For example, the job scheduler assigns camera 108-N as the master node for the job and assigns camera 108-1 and camera 108-2 as servants. Thus, as the servant nodes, e.g., cameras 108-1 and 108-2 finish their job for processing the media; the servant nodes provide results to the master node, e.g., camera 108-N.

In order to improve communication efficiency in the local data cloud, the job scheduler only provides job assignment metadata to each of the cameras. For example, the job assignment metadata includes a description of each task the camera is instructed to perform. The camera requesting for processing transmits the video footage to the other cameras. Additionally, after each camera finishes processing the video footage based on their instructed task, each of the other cameras, e.g., servant nodes, provides the results to the camera that requested the processing, e.g., master node. The results do not need to be provided to the job scheduler.

For example, the job scheduler transmits the complete job assignment metadata to the master node, e.g., camera 108-N. In response, the camera 108-N transmits only the data necessary to a servant node, e.g., the camera 108-N transmits 10 seconds of recorded video footage to camera 108-1 and 10 seconds of recorded video footage to servant node 108-2. The job scheduler also communicates the individual assignment to each servant node along with the master node ID, so that each servant node will be prepared to allocate the required resources for the assignment and be prepared to receive data from the mater node. For example, the job scheduler can indicate that camera 108-1 and camera 108-2 both perform object detection. Alternatively, the job scheduler can indicate that camera 108-1 performs facial recognition and camera 108-2 performs motion detection. In another example, the job scheduler can indicate that camera 108-1 performs both facial recognition and motion detection and camera 108-2 perform object detection.

The job scheduler can provide the master node ID that includes an identification of the master node, such as 001, along with an internet protocol (IP) address or media access control (MAC) address of the master node for routing communications. Once a servant node completes its assignment, the servant node will send the results directly to the master node over the network 106. Additionally, each servant node will transmit a notification to the job scheduler indicating that its task is complete and include its current compute resources available. Once each servant node completes the assignments, the master node collects the results from each servant node. For example, the results can include the video footage and timestamps in the video footage where objects were detected, motion was detected, or faces were detected. The master node then transmits an acknowledgement to the job scheduler indicating the completion of the distributed data processing jobs.

In one illustration of how this system may be implemented is shown in system 100 where a camera 108-N can record video footage in a particular area surrounding a monitored property (A). The camera 108-N can monitor a front yard or a front driveway at a monitored property 102. The camera 108-N can record video footage from its field of view. In some examples, the camera 108-N can detect motion while recording footage. In other examples, the camera 108-N can record video footage and provide a notification to the job scheduler to use distributed shared processing to determine whether motion exists in the recorded video footage.

The job scheduler, which can be a software module executing on the camera 108-N, can receive a request from the camera 108-N to determine whether motion exists in the recorded video footage and whether one or more humans are detected in the video footage. In response, the job scheduler determines compute resources available corresponding to each of the local cameras. For example, the job scheduler transmits a request to each of the cameras for their compute resources availability. In response to receiving each of the cameras' compute resources availability, the job scheduler determines the current resources available for each of the cameras. In some implementations, the job scheduler can check resources available for devices other than cameras, such as a digital video recorder (DVR), a stream video recorder (SVR), a display panel, or a combination of these. Using the current resources available for each of the cameras, the job scheduler generates an assignment for each of the local nodes (B). In particular, the job scheduler can generate and provide an assignment to each of the cameras, the DVR, the SVR, and the display panel.

For example, as illustrated in system 100, the job scheduler can determine that camera 108-1 has 80% compute resources available, camera 108-2 has 90% compute resources available, and cameras 108-N has 10% compute resources available. In response, the job scheduler, which is located at the camera 108-N, determines that camera 108-1 will perform human recognition on recorded video and that camera 108-2 will perform vehicle detection on the recorded video. The job scheduler can determine that camera 108-N will not perform a task because camera 108-N lacks sufficient idle cycles to perform additional processing.

Thus, the job scheduler transmits an instruction to camera 108-2 indicating that the master node, e.g., camera 108-N, will transmit recorded video footage to the camera 108-2 and an instruction to perform vehicle detection on the video footage in response to receiving the video footage (C). Additionally, the job scheduler transmits an instruction to camera 108-1 indicating that the master node will transmit recorded video footage to the camera 108-1 and instruction to perform object detection on the video footage in response to receiving the video footage (D). Then, camera 108-N transmits the recorded video footage to each of the other cameras based on the instruction from the job scheduler.

In response to each servant node, e.g., camera 108-1 and camera 108-2, completing its assignment, each servant node will send the results back to the master node, e.g., camera 108-N. For example, camera 108-1 sends back a notification to the camera 108-N indicating that a vehicle was detected in the recorded video footage. Additionally, the notification can include timestamps in the video footage where the vehicle was detected, as well as locations in the actual frames of the video footage showing where the vehicle was detected.

Likewise, camera 108-2 sends back a notification to the camera 108-N indicating that a person was detected in the recorded footage. In particular, the camera 108-2 can label timestamps in the recorded video footage where the human was detected and locations in the frames of the video footage showing where the human was detected. In addition, each servant node transmits a notification to the job scheduler indicating that its job is complete and provides a status of its current processing resources to the job scheduler for tracking purposes. Once each servant node completes its task and the master node includes the results from each service node, the master node, camera 108-N, transmits an acknowledgement to the job scheduler regarding the completion of the distributed processing of the recorded video footage.

In some implementations, once the servant nodes finish performing the job assignment task, the master node can take one or more additional steps. For example, upon receiving a notification from the cameras 108-1 and 108-2 that a human was detected in the recorded video and a vehicle was detected in the recorded video, the camera 108-N can transmit a notification to the security panel 104 indicating that the vehicle is driving towards the garage 120. The security panel 104 can take additional steps to automatically open the door of the garage 120. Additionally, the security panel 104 can transmit a notification to a client device of the property owner to tell the property owner that a particular individual is approaching the garage 120. Other automated steps can be taken by the security panel 104 and the cameras located at the monitored property 102.

The local computing cloud can also interact in different examples using video surveillance. In one case, each camera located at the monitored property 102 can be preloaded with a similar deep human detector that uses convolutional neural networks. For a particular camera, such as camera 108-N, a data processing request provided to the job scheduler can include passing recorded video footage through a specific convolutional layer of the neural network. Using the local computing cloud, this data processing need can be fulfilled by the job scheduler through data parallelism. In this example, the input data, e.g., recorded video, is split into multiple rectangular regions.

Each local node in the local computing cloud is assigned to conduct the convolutional processing through a specific convolutional layer using one the rectangular regions. By assigning different frames or regions to different nodes, e.g., cameras, for processing, the overall frame rate of the system can be maintained at a high frame rate.

In a similar example, in which the data processing request includes passing data through a convolutional layer, a convolutional layer contains multiple convolution kernels, one kernel for each output channel. Therefore, using the local computing cloud, the data processing request can be fulfilled by performing kernel parallelism. In this case, different convolution kernels are assigned to different cameras. For example, one camera is only responsible for the computation using a subset of the convolution kernels over the entire input data. The same convolution task can also be done by using data parallelism and kernel parallelism schemes when both the input data and the convolution kernels are split and assigned across different cameras.

In another example, each camera can store a large deep neural network model. In this case, a large deep neural network model can be required to obtain the necessary performance and rate. However, due to limited storage capabilities on the camera, a large deep neural network model can be too large to fit on a single camera. This problem can be solved by using the local computing cloud. In this case, the parameters of the large deep neural network model are stored in a distributed manner across multiple cameras. When a data processing request using the deep model is invoked, the job scheduler is responsible to orchestrate the overall distributed processing pipeline including processing order of the cameras and data flow. In this case, the data flow between the cameras can also include layer parameters sent from one camera to another.

Each camera acting as a servant node retains a reserve of processing power. The reserve of processing power includes sufficient processing power to continue to monitor its own video feed with lightweight algorithms, such as motion detection or background subtraction. If these algorithms indicate an event might be occurring in the camera video feed, the camera informs the job scheduler. In response, the job scheduler will reallocate resources to handle both the original event and the newly detected event. This is generally advantageous to devote a camera's compute resources to its own video feed if there is an event occurring there. As a result, the job scheduler will direct the camera to transfer any intermediate data related to the original job to another camera, which will overtake the job. If there are idle nodes in the system, the job scheduler will assign the idle nodes to both backfill the original jobs being performed by the camera and to service jobs related to the new event.

In the case that each of the nodes was already tasked, the job scheduler can scale down an amount of resources allocated to processing each event. The job scheduler might use certain policies to distribute resources based on camera location and type, or on the nature of the event. The job scheduler can dynamically adjust resource allocation as the amount of activity or the complexity of the activity for a particular camera feed varies over time.

In some implementations, the job scheduler can use knowledge of camera placement and event history at the monitored property to guide assignment of jobs to cameras that are less likely to see events on their own feeds. For example, the job scheduler would be more likely to assign a job to a camera in a storage room than to a camera that faces a busy street. If there was an event in the front of a building, the job scheduler would be more likely to assign jobs to the cameras in the back of the building than the cameras on the side, since the activity in the front of the building might be expected to move into those views of cameras on the side of the building next. This strategy reduces the chances that a job might need to be reallocated, and increases the real-time processing resources available to a camera that is likely to observe an event in the near future. For example, given the event history of all the cameras at a monitored property, such as monitored property 102, over a training period, a camera event transition matrix A can be established to represent the event correlation and transition across cameras over a short period of time. The camera event transition matrix A is shown below in equation 1:

$$A_\tau = \begin{bmatrix} p_{1,1} & \cdots & p_{1,k} \\ \vdots & \ddots & \vdots \\ p_{k,1} & \cdots & p_{k,k} \end{bmatrix} \quad (1)$$

As illustrated in equation 1, the number k corresponds to the number of cameras or local nodes found in the monitored property 102. The camera event transition probability matrix A is then a k×k matrix. The elements of matrix A represent the probabilities that follow-up events will occur at the neighboring cameras within a certain time $\tau$ when a trigger event occurs at one of the cameras. For example, the matrix element $p_{i,j}$ is the probability that an event will occur in camera view j in the next $\tau$ seconds when a trigger event occurred in camera view i. The parameter $\tau$ can be determined by the estimated time required to finish a distributed processing job. Once these parameters are established, the camera event transition matrix can be used to guide the job scheduling process based on the requesting camera or node ID.

For example, when fulfilling a request from camera i and assigning a job to a servant node camera j, the job scheduler can allocate the resources on camera j to the assigned job based on $p_{i,j}$, e.g., by multiplying a multiplier $w_{i,j}=1-p_{i,j}$ to the current resources available on camera j. The job scheduler allocates resources on camera j so that if a follow-up event is very likely to occur at camera j in the near future, there will be sufficient resources reserved on camera j to handle the processing of the follow-up event, and thus, frequent job reallocation across multiple cameras can be avoided. The camera event transition matrix can be time varying, depending on when the trigger event occurs during the day. Therefore, the job scheduler can generate a series of camera event transition matrices to represent the event transition probabilities over different time slots of the day. The job scheduler can then adjust the resources allocated to assigned jobs for servant nodes not only based on data from the requesting camera but also based on a time of the day of the request by using the corresponding camera-event transition matrix for that particular time of day. Other global attributes, such as time of year, system arm state of the monitored property, or a current/predicted weather, can also lead to different probabilities for the camera-event transition matrix.

The job scheduler can also incorporate data from other sensors in the monitored property 102. For example, the job scheduler can incorporate data from PIR motion sensors, door state sensors, wireless location tracking, and weight sensors. For example, certain sensor activity provides a high probability for activating a certain camera. In this case, if a door sensor provides triggered data, the camera looking at that door can be instructed to begin recording video.

Additionally, other sensor activity in the kitchen in the next twenty seconds, for example, might project a probability curve forward in time. In this case, if the front door opens, a 50% chance exists that an event or activity in the kitchen will occur in the next twenty seconds. After those twenty seconds, the probability curve decays and the corresponding probability curve moves to a low probability if another activity exists in another room. The job scheduler can generate an activity graph or probability curve based on historical data. The activity graph can consist of nodes each representing a possible event activity and location. Each node is linked via probabilities. For example, the garage node has a strong link to the kitchen node, but may have a weak link to the yard node (except on Tuesday) if once a week the home owner takes out his trash when he gets home on Tuesday, but every other day goes straight into the kitchen. When the garage to yard connection is activated then the job scheduler updates the activity graph to now reflect that the next likely node is the garage node then the kitchen node. However, if the yard node was preceded by the front door node, the job scheduler would generate a different activity graph. In this case, the job scheduler would link the front door node and animal node and the next node is the yard node. Following the yard node, the job scheduler links the next node to be the driveway node. After some time elapses, the job scheduler links the driveway node, the yard node, and the front door node. In another example, if there is activity detected by a camera, but a user's phone is also detected as being located in that room, the job scheduler might reduce the priority of jobs related to that camera due to the high probability that the user is in the field of view in that room.

In general, the job scheduler can schedule jobs to cameras in a prioritized manner. The job scheduler chooses a manner in which the overall events can be processed in near real time. For example, the three cameras in system 100—camera 108-1, camera 108-2, and camera 108-N, simultaneously detect an ambiguous activity. Cameras 108-1 and 108-2 monitor entrances to the monitored property 102, while camera 108-N monitors a dog crate. The job scheduler can decide that the events detected by cameras 108-1 and 108-2 should be processed with higher priority than the event detected by camera 108-N. The job scheduler makes this determination based on activity detected by cameras 108-1 and 108-2 that is likely to trigger an urgent notification or alarm while activity detected in camera 108-N will simply trigger a recording of the dog sleeping, for example.

Thus, little penalty exists for a false positive or a false negative. Given that cameras 108-1 and 108-2 are tasked with detecting events of equal severity, the job scheduler can analyze the initial detection and confidence level from each camera, and attempt to optimize task allocation for each available local node to provide a positive delta, e.g., greater than a predetermined threshold, in total confidence as quickly as possible.

In some implementations, cameras can include nearby or overlapping fields of views. In these shared views, a target can be seen by multiple cameras in succession or simultaneously. These cameras that have shared views can share large amounts of data since these cameras attempt to model the same target in the same field of view area. Thus, the job scheduler might create combined jobs for these cameras, or ensure that key jobs for these cameras are collocated on the same node in order to reduce overall memory footprint, processing load, and data transfer between nodes.

Similarly, a local node or a camera might retrain a neural network model for a given target in memory, and build that model over time as the target traverses the property from camera to camera. This saves overhead time for each camera to create a new model or load a model from another location, such as another camera. Instead, the job scheduler can route imagery or features from each camera where the target might be visible to the node with the target model for confirmation and ongoing tracking and updates.

If two cameras overlap their field of view, then depending on an amount of how much video is shared and a confidence of video analytics, the job scheduler can decide that the video from one camera needs to be processed while a target is in a certain location. Additionally, the job scheduler can determine that the processing of the target can be performed on one feed of the camera over another. This relationship between two cameras can shift as the target moves through the scene and is better visible from one camera's view to the other camera's view.

In some implementations, the job scheduler or the master node can make real-time decisions regarding the video processing to end or reduce resources for particular nodes. For example, these decisions can end or be reduced if the event is suspected or confirmed to be a false alarm by the completed portion of the job. In some examples, the conclusion of the event is detected with some confidence, e.g., such as the target leaving the field of view of the camera. In this example, a ramp-down might exist, given the probability that another event might follow the first event, e.g., an individual walking out of the room even though they are still nearby. In another example, the job scheduler or the master node can confirm that the event is confirmed by the processing or by other means, such as, human confirmation or tripping of another sensor. Thus, the job scheduler has made the necessary decision. For example, given the case of an intruder outside the monitored property 102, the master node can confirm that the target is a person and is unrecognized, and then trigger an alarm. Then, the job scheduler can determine job assignments, such as facial recognition, target classification, target tracking, and video recording, while freeing resources so that other cameras so that other cameras can better monitor for accomplices to the intruder.

In some implementations, models can exist on each of the local nodes. Re-training or fine-tuning these models allows for improved analytics for individual use cases and specific fields of view. Some cameras can have enough idle cycles to allow a slow re-training process to occur as a background task, while the cameras perform tasks that are more important. However, busier cameras, which are the ones with the most urgent need of re-training or fine-tuning, might not have enough idle cycle to re-train its model. Thus, the training of a model for this camera can be shared across the other by the job scheduler, servant cameras that have more idle cycles than the busy camera. This can also work for the retraining of tasks.

One other enabler for re-training or fine-tuning is the need to store imagery for the re-training process. If one camera in the eco-system includes an SD card, or some other source of expanded storage, that device storage could be used to temporarily store the data needed for completing the re-training or fine tuning process.

A similar approach could be used to manage the data storage requirements. The history of the storage usage of each of the cameras or devices can be analyzed over time. The storage usage analyzer at the job scheduler can first, determine which device has the most free storage relative to how quickly the storage is being filled. For example, the front camera at the monitored property 102 viewing the busy road, can fill its SD card much more quickly than the backyard camera monitoring the tool shed, even though both cameras use the same size SD card. Second, the storage usage analyzer can determine when the storage write/read functions are typically idle. If the camera is typically busy writing clips to storage in the late afternoon and evening when the home owner are arriving at home, schedule the re-training job to use the storage at night or in the middle of the day, to avoid read/write conflicts.

The distributed processing performed across multiple cameras offers a way to manage complex tasks with heavy resources. Each camera can reserve a different set of resources in order to properly manage and process its own video feed. Additionally, each camera can have different policies for ramping up or ramping down their resources, depending on the use case, placement, and circumstances. Cameras typically have multiple ongoing processes. For example, these ongoing processes can include image capture, image processing, video analytics, recording, clip encoding, live streaming, and background maintenance that can all be adjusted to free additional resources.

In some implementations, cameras with no activity can reduce the resolution of the video they process. For example, the cameras can reduce video resolution for processing by effectively shortening their detection range or decreasing accuracy and sensitivity. Additionally, the cameras can reduce the frame rate of process or alter their streaming settings to free room for other jobs that they can act on or be instructed to act on from the job scheduler. Additionally, a camera that was guaranteed to have no activity could temporarily provide its resources to other jobs, including the ISP if the camera architecture allowed. In some examples, certain cameras have a better compute-to-pixels ratio than others, and as such, video footage from a low ratio camera can be provided to a camera with a high compute-to-pixels ratio, rather than the other way around. Additionally, battery-powered cameras can be used for cameras 108-1 through 108-N, and the job scheduler can take into account a battery life and power models for each of the battery powered cameras.

Figure 1B:
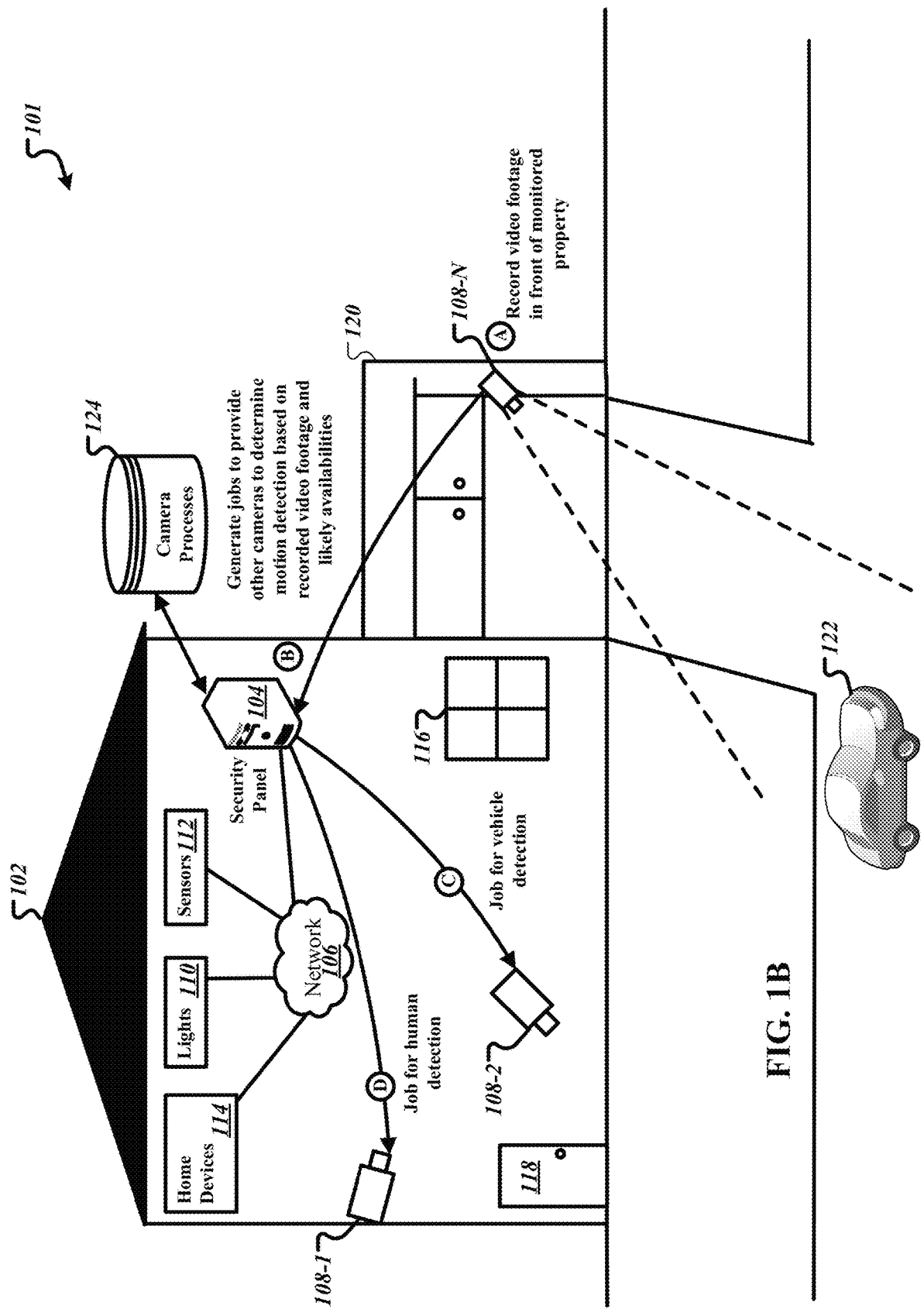
FIG. 1B is a context diagram of an example system of monitored property illustrating a security panel distributing video processing to other cameras based on a detected event by a particular camera.

FIG. 1B is a context diagram of an example system 101 of a monitored property 102 illustrating a security panel distributing shared video processing to other cameras based on a detected event by a particular camera. System 101 is similar to system 100. However, the location of the job scheduler has changed. For example, in system 100, the job scheduler is located on the camera 108-N. In system 101, the job scheduler is located on the security panel 104. The job scheduler can also be located on other places within the monitored property, such as, for example, the camera 108-1, camera 108-2, or a client device owned by the a property owner of the monitored property 102.

Stages A through D in system 101 are similar to the stages A through D in system 100. However, in system 101, the camera 108-N provides the recorded video footage to the job scheduler at the security panel 104 in (B). At (B), the security panel 104 can assess the job requested by the camera 108-N, determine available compute resources of each camera and generate jobs to provides to each of the cameras. As shown in system 101, the job scheduler at the security panel 104 instructs camera 108-2 to perform the vehicle detection (C) and instructs camera 108-1 to perform the human detection (D). In some examples, the job sched-uler transmits the recorded video to each camera with the corresponding job description.

In some implementations, the security panel 104 can communicate with a camera processes database 124. The camera processes database 124 stores a variety of information related to the cameras in the cloud. For example, the information includes IDs for each of the cameras at the monitored property 102, data indicating a type of each of the cameras, whether the cameras have a high or low resolution, and an amount of storage associated with each camera. Additionally, the camera processes database 124 can store information related to neural network models stored on each of the cameras. The information can include data used to train/re-train the models, parameters associated with each of the models, and results of the models for each of the cameras.

The job scheduler can use the data from the camera processes database 124 to aid in determining jobs for each of the non-requesting cameras. For example, if camera 108-N provides recorded video footage to the job scheduler at the security panel 104, the job scheduler can retrieve, from the camera processes database 124, a number of cameras found in the monitored property 102, contact information for communicating with each of the cameras, compute resources available for each of the cameras, resolution for each of the cameras, and data indicating possible future detected events for each camera. The job scheduler generates job assignments to each of these cameras based on the data retrieved from the camera processes database 124.

Figure 2:
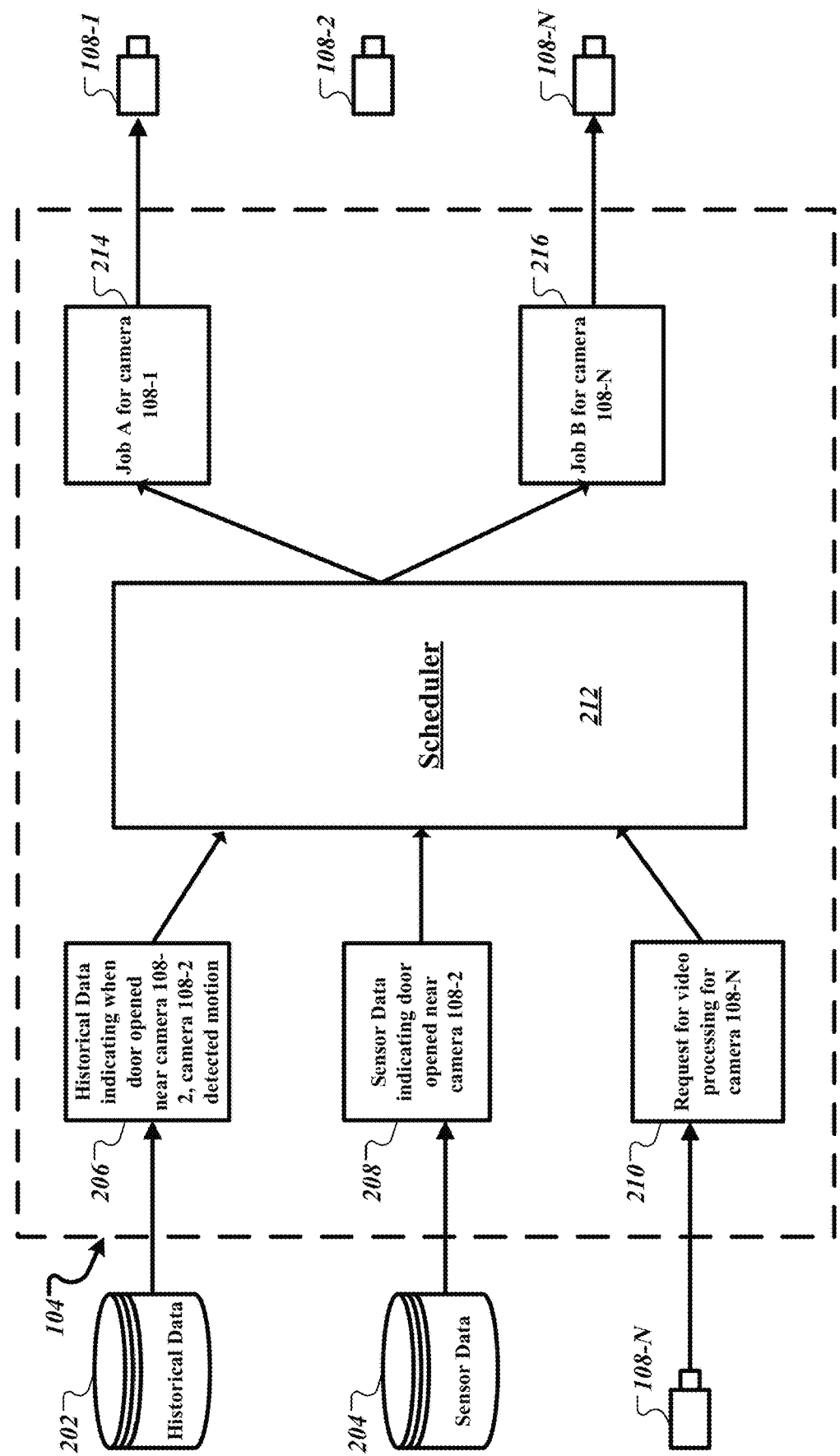
FIG. 2 is a context diagram of an example system of a job scheduler for generating jobs for cameras based on historical data and sensor data.

FIG. 2 is a context diagram of an example system of a job scheduler for generating jobs for cameras based on historical data and sensor data. The job scheduler shown in FIG. 2 is implemented in the security panel 104, from systems 100 and 101. However, as previously mentioned, the job scheduler can be implemented in other locations, such as one of the cameras in the monitored property 102 or a client device found at the monitored property.

The job scheduler can receive various information to determine which jobs should be assigned to the various cameras in the monitored property. For example, the system shown in FIG. 2, includes a job scheduler 212, a camera 108-1, a camera 108-2, a camera 108-N, historical data 202, and sensor data 204. The camera 108-N provides a request 210 to the job scheduler 212 for processing video recorded by the camera 108-N.

The job scheduler 212 retrieves historical data 202 from the camera processes database 124. The historical data 202 can include timestamped data, such as video showing detected events, when the detected events occurred, and sensor data surrounding the timestamped data. The sensor data can indicate actions related to a door, e.g., opening, closing, locking, or unlocking, and detected motion data within proximity to the door, to name a few examples. Additionally, the job scheduler 212 retrieves sensor data 204 from the home devices 114, the lights 110, the sensors 112, and the camera processes database 124. The sensor data 204 retrieved from the home devices 114, the lights 110, and the sensors 112 can correspond to currently recorded sensor data. The sensor data retrieved from the camera processes database 124 can correspond to previously recorded sensor data over a predetermined period of time. For example, the sensor data can include motion data, data indicating a door has opened, closed, locked or unlocked, data indicating whether a window has opened, closed, locked or unlocked, sensor data from weight sensors, sensor data from thermostats, and data indicating locations where the corresponding sensors are located in the monitored property 102.

As illustrated in FIG. 2, the camera 108-N provides a request 210 for processing recorded video. Because the job scheduler 212 is located at a separate location from the camera 108-N, e.g., located at the security panel 104, the camera 108-N provides the request 210 with the recorded video to the security panel 104 over network 106. In response to receiving the video, the job scheduler 212 can store the request 210 with the recorded video in the camera processes database 124 for later retrieval purposes.

The job scheduler 212 can also retrieve the sensor data 204 from the camera processes database 124 and the sensors 112 found at the monitored property 102. For example, the job scheduler 212 retrieves sensor data 208 that indicates a door has opened near camera 108-2. The door corresponds to the front door 118 at the monitored property 102, given that the camera 108-2 monitors the front door 118. The sensor data 208 can include current data from the sensors 112 at the monitored property 102.

The job scheduler 212 can also retrieve the historical data 202 from the camera processes database 124. The historical data 202 can include data 206 indicating when the front door open near camera 108-2 and a timestamp of when the camera 108-2 detected motion within proximity to the camera 108-2. The detected motion can include detection of the door swinging open or close or detected motion of a person moving within proximity to the monitored property 102.

The job scheduler 212 can provide historical data 206, sensor data 208, and the request 210 as input to its software module to assign jobs to each of the cameras in the monitored property 102. The job scheduler 212 can also request for the current compute resource availability from each of the cameras to provide as input to its software module. Using the data provided by each of the cameras, the sensor data 208, and the historical data 206, the job scheduler 212 can determine job A 214 for camera 108-1 and determine job B 216 for camera 108-N. The job scheduler does not provide a job to camera 108-2 for various reasons, e.g., no idle cycles available for processing, the likelihood that camera 108-2 will be busy in the 5 hours is greater than a predetermined threshold, or a battery life level of camera 108-2 does not support the processing required for either job A 214 or job B 216. In the case that the battery life of camera 108-2 is low, the job scheduler 212 can transmit a notification to a client device of the property owner to indicate that the battery life of a particular camera is low, and should be replaced. Additionally, the job scheduler 212 can display a notification on a display of the security panel 104 indicating that the camera's battery life is low.

The job scheduler 212 can produce jobs 214 and 216 based on the request 210 from the camera 108-N. For example, the request 210 can indicate that it requests motion and human detection in the recorded video. The job scheduler 212 can determine that camera 108-1 is to perform the motion detection job 214 and camera 108-N is to perform the human detection job 216. Then, the job scheduler 212 can transmit the job A 214 to the camera 108-1 and job B 216 to the camera 108-N for processing.

Next, the job scheduler 212 assigns camera 108-N as the master node and camera 108-1 as the servant node. In particular, in assigning the camera 108-N as the master node, the job scheduler 212 transmits a notification to the camera 108-N indicating it as the master node. Additionally, the notification indicates to the camera 108-N to transmit the recorded video footage to the camera 108-1. Once camera 108-1 finishes performing its respective assigned job 214, camera 108-1 transmits its results of the motion detection back to the master node, e.g., camera 108-N. Camera 108-1 also transmits a response to the job scheduler 212 indicating it has finished its job 214 and includes its current processing resources available.

Additionally, once camera 108-N finishes performing its respective assigned job 216, camera 108-N waits for the results from the camera 108-1. When both cameras have completed their job and camera 108-N has the results, camera 108-N provides an acknowledgement back to the job scheduler 212 indicating the completion of both assigned jobs 214 and 216.

Figure 3:
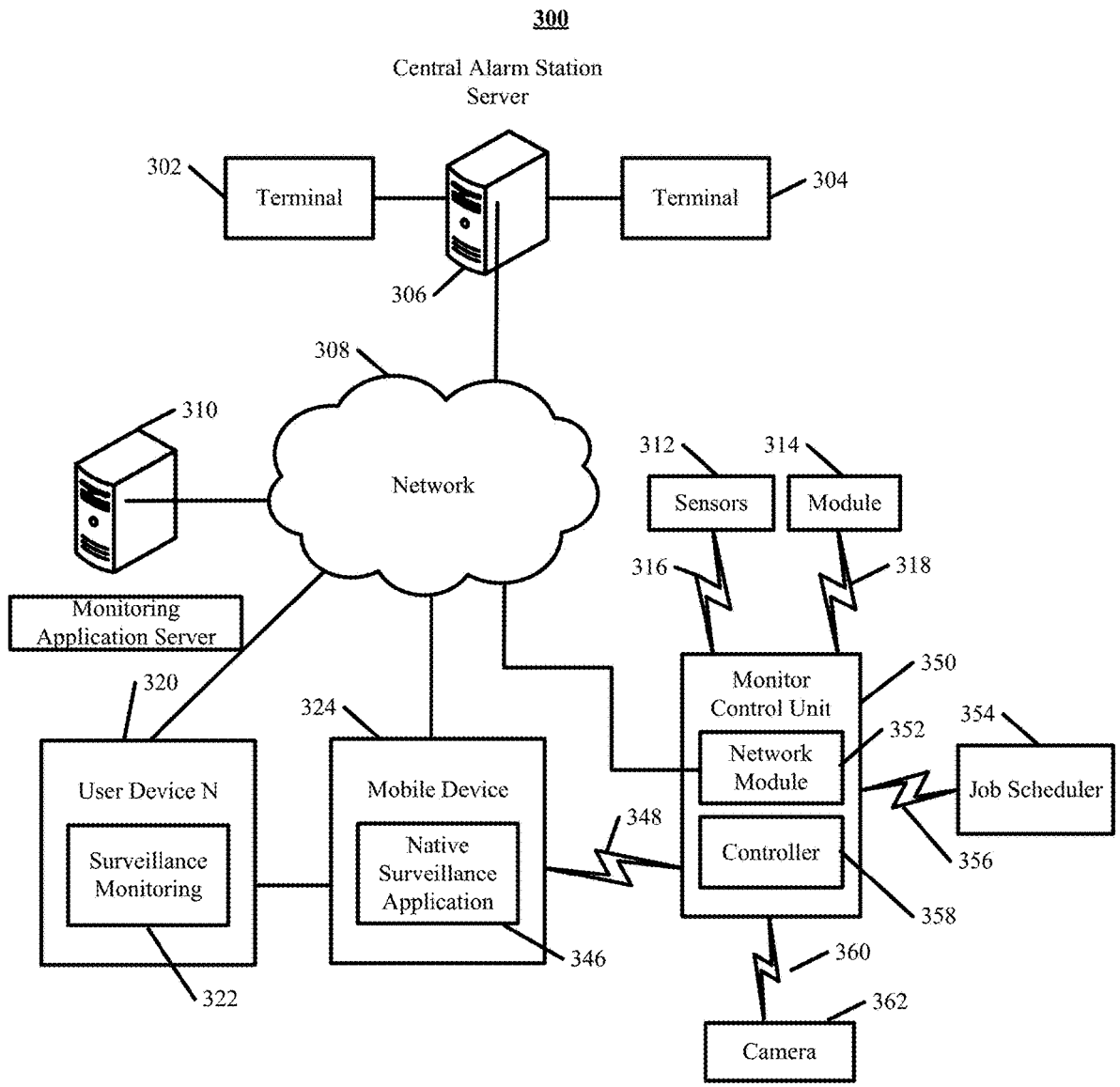
FIG. 3 is an example of a monitoring system integrated with an extended camera.

FIG. 3 illustrates an example of a monitoring system 300 integrated with an extended camera. The system 300 includes a network 308, a monitoring system control unit 350, one or more user devices 320, 324, a monitoring application server 310, and a central alarm station server 306. In some examples, the network 308 facilitates communications between the monitoring system control unit 350, the one or more user devices 320, 324 the monitoring application server 310, and the central alarm station server 306.

The network 308 is configured to enable exchange of electronic communications between devices connected to the network 308. For example, the network 308 can be configured to enable exchange of electronic communications between the monitoring system control unit 350, the one or more user devices 320, 324, the monitoring application server 310, and the central alarm station server 306. The network 308 can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 308 can include multiple networks or subnetworks, each of which can include, for example, a wired or wireless data pathway. The network 308 can include a circuit-switched network, a packet-switched data network, or any other network able to carry electronic communications (e.g., data or voice communications). For example, the network 308 can include networks based on the Internet protocol (IP), asynchronous transfer mode (ATM), the PSTN, packet-switched networks based on IP, X.25, or Frame Relay, or other comparable technologies and can support voice using, for example, VoIP, or other comparable protocols used for voice communications. The network 308 can include one or more networks that include wireless data channels and wireless voice channels. The network 308 can be a wireless network, a broadband network, or a combination of networks including a wireless network and a broadband network.

The monitoring system control unit 350 includes a controller 358 and a network module 352. The controller 358 is configured to control a monitoring system (e.g., a home alarm or security system) that includes the monitoring system control unit 350. In some examples, the controller 358 can include a processor or other control circuitry configured to execute instructions of a program that controls operation of an alarm system. In these examples, the controller 358 can be configured to receive input from sensors, detectors, or other devices included in the alarm system and control operations of devices included in the alarm system or other household devices (e.g., a thermostat, an appliance, lights, etc.). For example, the controller 358 can be configured to control operation of the network module 352 included in the monitoring system control unit 350.

The network module 352 is a communication device configured to exchange communications over the network 308. The network module 352 can be a wireless communication module configured to exchange wireless communications over the network 308. For example, the network module 352 can be a wireless communication device configured to exchange communications over a wireless data channel and a wireless voice channel. In this example, the network module 352 can transmit alarm data over a wireless data channel and establish a two-way voice communication session over a wireless voice channel. The wireless communication device can include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 352 also can be a wired communication module configured to exchange communications over the network 308 using a wired connection. For instance, the network module 352 can be a modem, a network interface card, or another type of network interface device. The network module 352 can be an Ethernet network card configured to enable the monitoring system control unit 350 to communicate over a local area network and/or the Internet. The network module 352 also can be a voiceband modem configured to enable the alarm panel to communicate over the telephone lines of Plain Old Telephone Systems (POTS).

The monitoring system that includes the monitoring system control unit 350 includes one or more sensors or detectors. For example, the monitoring system can include multiple sensors 312. The sensors 312 can include a contact sensor, a motion sensor, a glass break sensor, or any other type of sensor included in an alarm system or security system. The sensors 312 also can include an environmental sensor, such as a temperature sensor, a water sensor, a rain sensor, a wind sensor, a light sensor, a smoke detector, a carbon monoxide detector, an air quality sensor, etc. The sensors 312 further can include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 312 can include a radio-frequency identification (RFID) sensor that identifies a particular article that includes a pre-assigned RFID tag.

The monitoring system control unit 350 communicates with the module 314 and the camera 362 to perform surveillance or monitoring. The module 314 is connected to one or more lighting systems and is configured to control operation of the one or more lighting systems. The module 314 can control the one or more lighting systems based on commands received from the monitoring system control unit 350. For instance, the module 314 can cause a lighting system to illuminate an area to provide a better image of the area when captured by a camera 362.

The camera 362 can be a video/photographic camera or other type of optical sensing device configured to capture images. For instance, the camera 362 can be configured to capture images of an area within a building monitored by the monitoring system control unit 350. The camera 362 can be configured to capture single, static images of the area and also video images of the area in which multiple images of the area are captured at a relatively high frequency (e.g., thirty images per second). The camera 362 can be controlled based on commands received from the monitoring system control unit 350.

The camera 362 can be triggered by several different types of techniques. For instance, a Passive Infra-Red (PIR) motion sensor can be built into the camera 362 and used to trigger the camera 362 to capture one or more images when motion is detected. The camera 362 also can include a microwave motion sensor built into the camera and used to trigger the camera 362 to capture one or more images when motion is detected. The camera 362 can have a "normally open" or "normally closed" digital input that can trigger capture of one or more images when external sensors (e.g., the sensors 312, PIR, door/window, etc.) detect motion or other events. In some implementations, the camera 362 receives a command to capture an image when external devices detect motion or another potential alarm event. The camera 362 can receive the command from the controller 358 or directly from one of the sensors 312.

In some examples, the camera 362 triggers integrated or external illuminators (e.g., Infra-Red, Z-wave controlled "white" lights, lights controlled by the module 314, etc.) to improve image quality when the scene is dark. An integrated or separate light sensor can be used to determine if illumination is desired and can result in increased image quality.

The camera 362 can be programmed with any combination of time/day schedules, system "arming state," or other variables to determine whether images should be captured or not when triggers occur. The camera 362 can enter a low-power mode when not capturing images. In this case, the camera 362 can wake periodically to check for inbound messages from the controller 358. The camera 362 can be powered by internal, replaceable batteries if located remotely from the monitoring system control unit 350. The camera 362 can employ a small solar cell to recharge the battery when light is available. Alternatively, the camera 362 can be powered by the controller's 358 power supply if the camera 362 is co-located with the controller 358.

The sensors 312, the module 314, the camera 362, and the job scheduler 354 communicate with the controller 358 over communication links 316, 318, 356, and 360. The communication links 316, 318, 356, and 360 can be a wired or wireless data pathway configured to transmit signals from the sensors 312, the module 314, and the camera 362 to the controller 358. The sensors 312, the module 314, the camera 362, and the job scheduler 354 can continuously transmit sensed values to the controller 358, periodically transmit sensed values to the controller 358, or transmit sensed values to the controller 358 in response to a change in a sensed value.

The communication link 356 over which the job scheduler 354 and the controller 358 communicate can include a local network. The job scheduler 354 and the controller 358 can exchange images and commands over the local network. The local network can include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 310 is an electronic device configured to provide monitoring services by exchanging electronic communications with the monitoring system control unit 350, the one or more user devices 320, 324, and the central alarm station server 306 over the network 308. For example, the monitoring application server 310 can be configured to monitor events (e.g., alarm events) generated by the monitoring system control unit 350. In this example, the monitoring application server 310 can exchange electronic communications with the network module 352 included in the monitoring system control unit 350 to receive information regarding events (e.g., alarm events) detected by the monitoring system control unit 350. The monitoring application server 310 also can receive information regarding events (e.g., alarm events) from the one or more user devices 320, 324.

In some examples, the monitoring application server 310 can route alarm data received from the network module 352 or the one or more user devices 320, 324 to the central alarm station server 306. For example, the monitoring application server 310 can transmit the alarm data to the central alarm station server 306 over the network 308.

The monitoring application server 310 can store sensor and image data received from the monitoring system and perform analysis of sensor and image data received from the monitoring system. Based on the analysis, the monitoring application server 310 can communicate with and control aspects of the monitoring system control unit 350 or the one or more user devices 320, 324.

The central alarm station server 306 is an electronic device configured to provide alarm monitoring service by exchanging communications with the monitoring system control unit 350, the one or more user devices 320, 324, and the monitoring application server 310 over the network 308. For example, the central alarm station server 306 can be configured to monitor alarm events generated by the monitoring system control unit 350. In this example, the central alarm station server 306 can exchange communications with the network module 352 included in the monitoring system control unit 350 to receive information regarding alarm events detected by the monitoring system control unit 350. The central alarm station server 306 also can receive information regarding alarm events from the one or more user devices 320, 324.

The central alarm station server 306 is connected to multiple terminals 302 and 304. The terminals 302 and 304 can be used by operators to process alarm events. For example, the central alarm station server 306 can route alarm data to the terminals 302 and 304 to enable an operator to process the alarm data. The terminals 302 and 304 can include general-purpose computers (e.g., desktop personal computers, workstations, or laptop computers) that are configured to receive alarm data from a server in the central alarm station server 306 and render a display of information based on the alarm data. For instance, the controller 358 can control the network module 352 to transmit, to the central alarm station server 306, alarm data indicating that a sensor 312 detected a door opening when the monitoring system was armed. The central alarm station server 306 can receive the alarm data and route the alarm data to the terminal 302 for processing by an operator associated with the terminal 302. The terminal 302 can render a display to the operator that includes information associated with the alarm event (e.g., the name of the user of the alarm system, the address of the building the alarm system is monitoring, the type of alarm event, etc.) and the operator can handle the alarm event based on the displayed information.

In some implementations, the terminals 302 and 304 can be mobile devices or devices designed for a specific function. Although FIG. 3 illustrates two terminals for brevity, actual implementations can include more (and, perhaps, many more) terminals.

The one or more user devices 320, 324 are devices that host and display user interfaces. For instance, the user device 324 is a mobile device that hosts one or more native applications (e.g., the native surveillance application 346). The user device 324 can be a cellular phone or a non-cellular locally networked device with a display. The user device 324 can include a cell phone, a smart phone, a tablet PC, a personal digital assistant ("PDA"), or any other portable device configured to communicate over a network and display information. For example, implementations can also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 324 can perform functions unrelated to the monitoring system, such as placing personal telephone calls, playing music, playing video, displaying pictures, browsing the Internet, maintaining an electronic calendar, etc.

The user device 324 includes a native surveillance application 346. The native surveillance application 346 refers to a software/firmware program running on the corresponding mobile device that enables the user interface and features described throughout. The user device 324 can load or install the native surveillance application 346 based on data received over a network or data received from local media. The native surveillance application 346 runs on mobile devices platforms, such as iPhone, iPod touch, Blackberry, Google Android, Windows Mobile, etc. The native surveillance application 346 enables the user device 324 to receive and process image and sensor data from the monitoring system The user device 320 can be a general-purpose computer (e.g., a desktop personal computer, a workstation, or a laptop computer) that is configured to communicate with the monitoring application server 310 and/or the monitoring system control unit 350 over the network 308. The user device 320 can be configured to display a surveillance monitoring user interface 322 that is generated by the user device 320 or generated by the monitoring application server 310. For example, the user device 320 can be configured to display a user interface (e.g., a web page) provided by the monitoring application server 310 that enables a user to perceive images captured by the camera 362 and/or reports related to the monitoring system. Although FIG. 3 illustrates two user devices for brevity, actual implementations can include more (and, perhaps, many more) or fewer user devices.

In some implementations, the one or more user devices 320, 324 communicate with and receive monitoring system data from the monitoring system control unit 350 using the communication link 348. For instance, the one or more user devices 320, 324 can communicate with the monitoring system control unit 350 using various local wireless protocols such as Wi-Fi, Bluetooth, Zwave, Zigbee, HomePlug (ethernet over powerline), or wired protocols such as Ethernet and USB, to connect the one or more user devices 320, 324 to local security and automation equipment. The one or more user devices 320, 324 can connect locally to the monitoring system and its sensors and other devices. The local connection can improve the speed of status and control communications because communicating through the network 308 with a remote server (e.g., the monitoring application server 310) can be significantly slower.

Although the one or more user devices 320, 324 are shown as communicating with the monitoring system control unit 350, the one or more user devices 320, 324 can communicate directly with the sensors and other devices controlled by the monitoring system control unit 350. In some implementations, the one or more user devices 320, 324 replace the monitoring system control unit 350 and perform the functions of the monitoring system control unit 350 for local monitoring and long range/offsite communication.

In other implementations, the one or more user devices 320, 324 receive monitoring system data captured by the monitoring system control unit 350 through the network 308. The one or more user devices 320, 324 can receive the data from the monitoring system control unit 350 through the network 308 or the monitoring application server 310 can relay data received from the monitoring system control unit 350 to the one or more user devices 320, 324 through the network 308. In this regard, the monitoring application server 310 can facilitate communication between the one or more user devices 320, 324 and the monitoring system.

In some implementations, the one or more user devices 320, 324 can be configured to switch whether the one or more user devices 320, 324 communicate with the monitoring system control unit 350 directly (e.g., through communication link 348) or through the monitoring application server 310 (e.g., through network 308) based on a location of the one or more user devices 320, 324. For instance, when the one or more user devices 320, 324 are located close to the monitoring system control unit 350 and in range to communicate directly with the monitoring system control unit 350, the one or more user devices 320, 324 use direct communication. When the one or more user devices 320, 324 are located far from the monitoring system control unit 350 and not in range to communicate directly with the monitoring system control unit 350, the one or more user devices 320, 324 use communication through the monitoring application server 310.

Although the one or more user devices 320, 324 are shown as being connected to the network 308, in some implementations, the one or more user devices 320, 324 are not connected to the network 308. In these implementations, the one or more user devices 320, 324 communicate directly with one or more of the monitoring system components and no network (e.g., Internet) connection or reliance on remote servers is needed.

In some implementations, the one or more user devices 320, 324 are used in conjunction with only local sensors and/or local devices in a house. In these implementations, the system 300 only includes the one or more user devices 320, 324, the sensors 312, the module 314, and the camera 362. The one or more user devices 320, 324 receive data directly from the sensors 312, the module 314, and the camera 362 and sends data directly to the sensors 312, the module 314, and the camera 362. The one or more user devices 320, 324 provide the appropriate interfaces/processing to provide visual surveillance and reporting.

In other implementations, the system 300 further includes network 308 and the sensors 312, the module 314, and the camera 362 are configured to communicate sensor and image data to the one or more user devices 320, 324 over network 308 (e.g., the Internet, cellular network, etc.). In yet another implementation, the sensors 312, the module 314, and the camera 362 (or a component, such as a bridge/router) are intelligent enough to change the communication pathway from a direct local pathway when the one or more user devices 320, 324 are in close physical proximity to the sensors 312, the module 314, and the camera 362 to a pathway over network 308 when the one or more user devices 320, 324 are farther from the sensors 312, the module 314, and the camera 362. In some examples, the system leverages GPS information from the one or more user devices 320, 324 to determine whether the one or more user devices 320, 324 are close enough to the sensors 312, the module 314, and the camera 362 to use the direct local pathway or whether the one or more user devices 320, 324 are far enough from the sensors 312, the module 1214, and the camera 362 that the pathway over network 308 is required. In other examples, the system leverages status communications (e.g., pinging) between the one or more user devices 320, 324 and the sensors 312, the module 314, and the camera 362 to determine whether communication using the direct local pathway is possible. If communication using the direct local pathway is possible, the one or more user devices 320, 324 communicate with the sensors 312, the module 314, and the camera 362 using the direct local pathway. If communication using the direct local pathway is not possible, the one or more user devices 320, 324 communicate with the sensors 312, the module 314, and the camera 362 using the pathway over network 308.

In some implementations, the system 300 provides end users with access to images captured by the camera 362 to aid in decision making. The system 300 can transmit the images captured by the camera 362 over a wireless WAN network to the user devices 320, 324. Because transmission over a wireless WAN network can be relatively expensive, the system 300 uses several techniques to reduce costs while providing access to significant levels of useful visual information.

In some implementations, a state of the monitoring system and other events sensed by the monitoring system can be used to enable/disable video/image recording devices (e.g., the camera 362). In these implementations, the camera 362 can be set to capture images on a periodic basis when the alarm system is armed in an "Away" state, but set not to capture images when the alarm system is armed in a "Stay" state or disarmed. In addition, the camera 362 can be triggered to begin capturing images when the alarm system detects an event, such as an alarm event, a door opening event for a door that leads to an area within a field of view of the camera 362, or motion in the area within the field of view of the camera 362. In other implementations, the camera 362 can capture images continuously, but the captured images can be stored or transmitted over a network when needed.

In some implementations, all of the processing described throughout this disclosure can be implemented in a monitoring system control panel located inside the property being monitored, as opposed to sending data to an external server for processing. For example, rather than being a separate server located in a remote location, the monitoring application server 310 can be a logical component inside of the monitoring system control unit 350. In this example, the monitoring system control unit 150 performs the processing of supervising property access without having to send image/video data to a separate server separated by a network.

In other implementations, all of the processing described throughout this disclosure can be performed on a remote server (e.g., monitoring application server 310). In these implementations, the monitoring system control panel (or sensors themselves) can send image/video data to the remote server over a network and the remote server can perform all of supervising property access. For instance, the monitoring system control unit 350 sends all captured image/video data to the monitoring application server 310 and the monitoring application server 310 performs the processing of supervising property access.

In still further implementations, the processing described throughout this disclosure can be mixed between a monitoring system control panel and a remote server. In these implementations, the monitoring system control panel and the remote server can share operations needed to analyze the sensor data. For instance, the monitoring system control panel can perform the interpretation of image/video data collected relatively recently (e.g., image/video data collected within the past three months) and the remote server can perform the detection of patterns in image/video data collected over a longer period of time (e.g., image/video data collected over the past several years). Alternatively, the monitoring system control panel can perform pre-processing of the image/video data, including collection and aggregation of the image/video data, and the remote server can perform the detailed analysis of detecting patterns within the image/video data. In the example shown in FIG. 3, the processing described throughout this disclosure can be mixed between the monitoring system control unit 350 and the monitoring application server 310.

Figure 4:
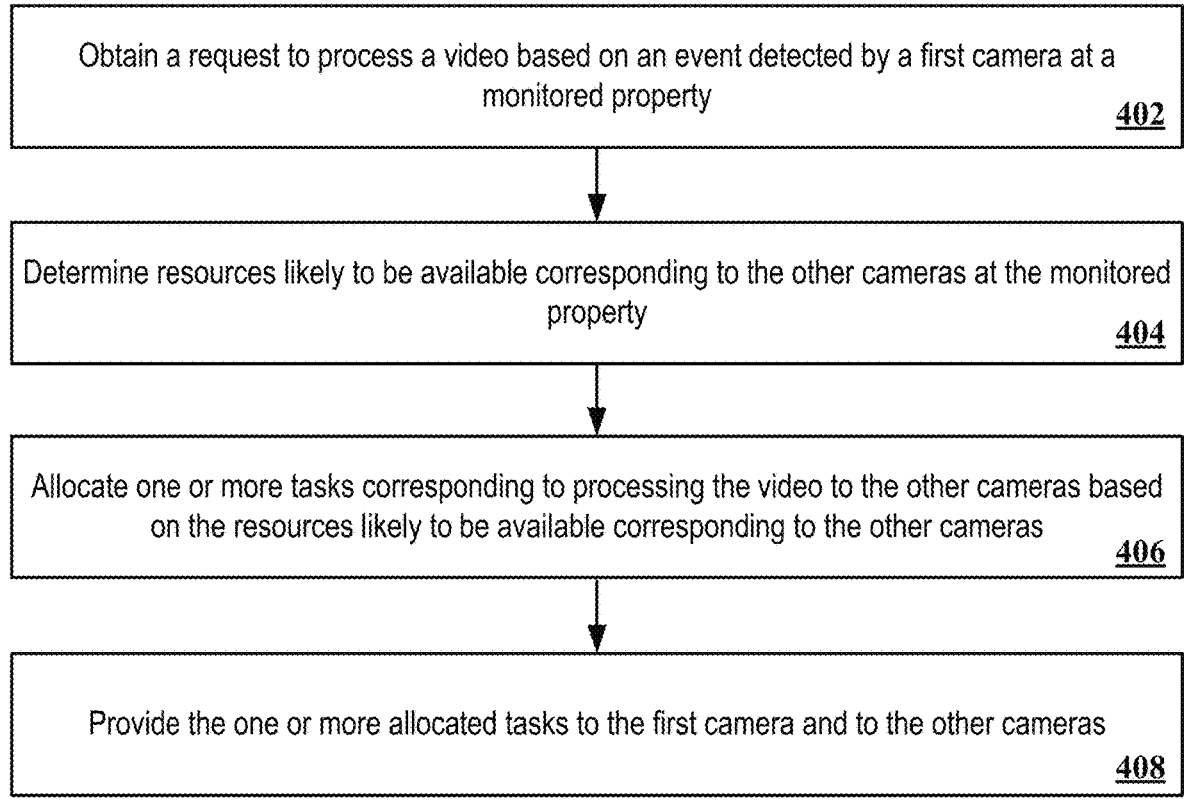
FIG. 4 is a flowchart illustrating an example process for generating distributed jobs for cameras in a monitored property based on a detected event by one of the cameras.

FIG. 4 is a flowchart illustrating of an example process for generating distributing jobs for cameras in a monitored property based on a detected event by one of the cameras. Generally, the process 400 includes obtaining a request to process a video based on an event detected by a first camera at a monitored property; determining resources likely to be available corresponding to the other cameras the monitored property; allocating one or more tasks corresponding to processing the video to the other cameras based on the resources likely to be available corresponding to the other cameras; and, providing the one or more allocated tasks to the first camera and to the other cameras.

A job scheduler obtains a request to process a video based on an event detected by a first camera at a monitored property (402). The job scheduler, which may be implemented by a processor of one or more cameras at the monitored property, can receive the request to process the video, e.g., perform motion/object/human/classification detection. The job scheduler can receive the request over a network. In the case that the job scheduler is stored at the first camera, the first camera notifies the job scheduler of the recorded video to be processed.

In some implementations, obtaining a request to process a video based on an event detected by a first camera at a monitored property includes receiving, by a job scheduler, the request from the first camera in response to the first camera detecting motion within the video. For example, the camera 108-1 may detect motion within five minutes of video and, in response, provide the job scheduler a request to process the five minutes of video. In some implementations, the job scheduler executes on a security panel. For example, the job scheduler may execute within the security panel 104.

The job scheduler determines resources likely to be available corresponding to the other cameras at the monitored property (404). The job scheduler monitors compute resources for each of the cameras located at the monitored property. For example, the job scheduler can determine available computing resources for each camera at a particular point in time and determine previous available resources for each camera over a previous period of time. Additionally, the job scheduler can predict how much computing resources a particular camera will have available in the future.

In some implementations, determining resources likely to be available corresponding to the other cameras at the monitored property includes obtaining event history of the other cameras and determining the resources likely to be available corresponding to the other cameras based on the event history of the other cameras. For example, the job scheduler may access stored event history of the cameras that indicates when an event is detected at camera 108-1, within the next thirty seconds afterwards another event is detected at camera 108-3 80% of the time and another event is detected at camera 108-2 10% of the time, and, in response determine from the probabilities that the camera 108-2 is more likely to have availability than the camera 108-3 when an event is detected at camera 108-1.

In some implementations, determining the resources likely to be available corresponding to the other cameras based on the event history of the other cameras includes determining, based on the event history, a probability that a follow-up event will occur at a second camera of the other cameras within a period of time and determining the resources likely to be available corresponding to the other cameras based on the probability. For example, the job scheduler may determine, from the event history, an event transition matrix that indicates probabilities of follow-up events at neighboring cameras happening soon where the neighboring cameras with lower probabilities of follow-up events are considered more likely to have more resources available.

In some implementations, determining resources likely to be available corresponding to the other cameras at the monitored property includes determining whether portions of the monitored property that correspond to the other cameras are occupied and determining the resources likely to be available corresponding to the other cameras based on whether the portions of the monitored property are occupied. For example, the job scheduler may determine that a first room that camera 108-2 is located in is not occupied, e.g., based on sensor data from a PIR sensor indicating no humans are present, and a second room that camera 108-3 is located in is occupied, e.g., based on sensor data from a PIR sensor indicating a human is present, and, in response, determine that the camera 108-2 is likely to have more resources available than the camera 108-1 since the camera 108-2 is in a room that is unoccupied and the camera 108-3 is in a room that is occupied.

The job scheduler can allocate one or more tasks corresponding to processing the video to the other cameras based on the resources likely to be available corresponding to the other cameras (406). For example, the job scheduler may assign a more processor intensive task to a camera that has more idle cycles or is more likely to have idle cycles in the future. Additionally, the job scheduler will assign a task that requires pixel resolution to cameras that can handle the pixel resolution. The job scheduler will set the cameras that did not provide the request as the servant nodes and the camera that provided the request as the master node. The job scheduler can distribute assigned tasks to both the servant nodes and the master node based on resources likely to be available corresponding to each of the cameras.

In some implementations, allocating one or more tasks corresponding to processing the video to the other cameras based on the resources likely to be available corresponding to the other cameras includes determining to provide a second camera a longer duration of the video than a third camera based on determining that the second camera has more computer resources unused than the third camera. For example, the job scheduler may determine that camera 108-2 has 80% resources available and camera 108-3 has 50% resources available, determine that the camera 108-2 has more resources unused than the camera 108-3 as 80% is greater than 50%, and, in response, determine to have the camera 108-2 process three minutes of video, the camera 108-3 process one minute of video, and the camera 108-1 process one minute of video.

In some implementations, allocating one or more tasks corresponding to processing the video to the other cameras based on the resources likely to be available corresponding to the other cameras includes determining to provide a second camera an object classification task and a third camera a motion detection task based on determining that the second camera is likely to have more computer resources unused than the third camera. For example, the job scheduler may determine that camera 108-2 is viewing a scene with very little changes and camera 108-3 is viewing a scene with moderate changes, in response, determine that the camera 108-2 is likely to have more resources available than the camera 108-3 as there is more likely to be motion by an object of interest seen by the camera 108-3 as there are more changes, and, in response, determine to have the camera 108-2 perform object classification on the video and the camera 108-3 perform more lightweight motion detection on the video from the camera 108-1. The job scheduler can provide the one or more allocated tasks to the first camera and to the other cameras (408). The job scheduler can transmit the instructed tasks to each of the other cameras. Additionally, if the master node is instructed to perform a task, the job scheduler can transmit its task to the master node. The allocated tasks, along with the corresponding instructions, are transmitted over the network to the other cameras and, if necessary, to the camera that transmitted the request.

In some implementations, providing the one or more allocated tasks to the first camera and to the other cameras includes providing job assignment metadata to the other cameras and instructing the first camera to provide corresponding portions of the video to the other cameras. For example, the job scheduler may notify the camera 108-2 that the camera 108-2 will be processing a three minute portion of video, notify the camera 108-3 that the camera 108-3 will be processing the next one minute portion of the video, and then notify the camera 108-1 to provide the three minute portion of the video to the camera 108-2 and the one minute portion of the video to the camera 108-3.

In some implementations, instructing the first camera to provide corresponding portions of the video to the other cameras includes providing the job assignment metadata to the first camera. For example, the job scheduler may notify the camera 108-1 that the camera 108-2 will be processing a three minute portion of video and the camera 108-3 will be processing the next one minute portion of the video and, in response, the camera 108-1 may provide those portions to the cameras 108-2 and 108-3.

In some implementations, providing the one or more allocated tasks to the first camera and to the other cameras includes instructing the other cameras to provide results of the one or more tasks to the first camera. For example, along with notifying the camera 108-2 that the camera 108-2 will be processing the three minute portion of the video, the job scheduler may notify the camera 108-2 to provide results of the processing the camera 108-1.

The described systems, methods, and techniques can be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
    obtaining a request to process a video based on an event detected by a first camera at a monitored property;
    obtaining event history of other cameras at the monitored property;
    determining, based on the event history, respective likelihoods that another event will occur in the future within view of each of the other cameras at the monitored property;
    determining resources likely to be available corresponding to the other cameras at the monitored property based on the respective likelihoods that another event will occur in the future within view of each of the other cameras;
    allocating one or more tasks corresponding to processing the video to the other cameras based on the resources likely to be available corresponding to the other cameras; and
    providing the one or more allocated tasks to the first camera and to the other cameras.

2. The method of claim 1, wherein determining the resources likely to be available corresponding to the other cameras at the monitored property comprises:
    determining, based on the event history, a probability that a follow-up event will occur at a second camera of the other cameras within a period of time; and
    determining the resources likely to be available corresponding to the other cameras based on the probability.

3. The method of claim 1, wherein determining the resources likely to be available corresponding to the other cameras at the monitored property comprises:
 determining whether portions of the monitored property that correspond to the other cameras are occupied; and
 determining the resources likely to be available corresponding to the other cameras based on whether the portions of the monitored property are occupied.

4. The method of claim 1, wherein obtaining a request to process a video based on an event detected by a first camera at a monitored property comprises:
 receiving, by a job scheduler, the request from the first camera in response to the first camera detecting motion within the video.

5. The method of claim 4, wherein the job scheduler executes on a security panel.

6. The method of claim 1, wherein allocating one or more tasks corresponding to processing the video to the other cameras based on the resources likely to be available corresponding to the other cameras comprises:
 determining to provide a second camera a longer duration of the video than a third camera based on determining that the second camera has more computer resources unused than the third camera.

7. The method of claim 1, wherein allocating one or more tasks corresponding to processing the video to the other cameras based on the resources likely to be available corresponding to the other cameras comprises:
 determining to provide a second camera a first type of task and a third camera a second, different type of task based on determining that the second camera is likely to have more computer resources unused than the third camera.

8. The method of claim 7, wherein determining to provide a second camera a first type of task and a third camera a second, different type of task based on determining that the second camera is likely to have more computer resources unused than the third camera comprises:
 determining to provide a second camera an object classification task and a third camera a motion detection task based on determining that the second camera is likely to have more computer resources unused than the third camera.

9. The method of claim 1, wherein providing the one or more allocated tasks to the first camera and to the other cameras comprises:
 providing job assignment metadata to the other cameras; and
 instructing the first camera to provide corresponding portions of the video to the other cameras.

10. The method of claim 9, wherein instructing the first camera to provide corresponding portions of the video to the other cameras comprises:
 providing the job assignment metadata to the first camera.

11. The method of claim 1, wherein providing the one or more allocated tasks to the first camera and to the other cameras comprises:
 instructing the other cameras to provide results of the one or more tasks to the first camera.

12. A system comprising:
 one or more computers and one or more storage devices storing instructions that are operable, when executed by the one or more computers, to cause the one or more computers to perform operations comprising:
 obtaining a request to process a video based on an event detected by a first camera at a monitored property;
 obtaining event history of other cameras at the monitored property;
 determining, based on the event history, respective likelihoods that another event will occur in the future within view of each of the other cameras at the monitored property;
 determining resources likely to be available corresponding to the other cameras at the monitored property based on the respective likelihoods that another event will occur in the future within view of each of the other cameras;
 allocating one or more tasks corresponding to processing the video to the other cameras based on the resources likely to be available corresponding to the other cameras; and
 providing the one or more allocated tasks to the first camera and to the other cameras.

13. The system of claim 12, wherein determining the resources likely to be available corresponding to the other cameras at the monitored property comprises:
 determining, based on the event history, a probability that a follow-up event will occur at a second camera of the other cameras within a period of time; and
 determining the resources likely to be available corresponding to the other cameras based on the probability.

14. The system of claim 12, wherein determining the resources likely to be available corresponding to the other cameras at the monitored property comprises:
 determining whether portions of the monitored property that correspond to the other cameras are occupied; and
 determining the resources likely to be available corresponding to the other cameras based on whether the portions of the monitored property are occupied.

15. The system of claim 12, wherein obtaining a request to process a video based on an event detected by a first camera at a monitored property comprises:
 receiving, by a job scheduler, the request from the first camera in response to the first camera detecting motion within the video.

16. The system of claim 15, wherein the job scheduler executes on a security panel.

17. The system of claim 12, wherein allocating one or more tasks corresponding to processing the video to the other cameras based on the resources likely to be available corresponding to the other cameras comprises:
 determining to provide a second camera a longer duration of the video than a third camera based on determining that the second camera has more computer resources unused than the third camera.

18. A non-transitory computer-readable medium storing software comprising instructions executable by one or more computers which, upon such execution, cause the one or more computers to perform operations comprising:
 obtaining a request to process a video based on an event detected by a first camera at a monitored property;
 obtaining event history of other cameras at the monitored property;
 determining, based on the event history, respective likelihoods that another event will occur in the future within view of each of the other cameras at the monitored property;
 determining resources likely to be available corresponding to the other cameras at the monitored property based on the respective likelihoods that another event will occur in the future within view of each of the other cameras;

allocating one or more tasks corresponding to processing the video to the other cameras based on the resources likely to be available corresponding to the other cameras; and providing the one or more allocated tasks to the first camera and to the other cameras.

* * * * *